(12) United States Patent
Seeger (10) Patent No.: US 11,845,503 B2
(45) Date of Patent: Dec. 19, 2023

(54) MOTOR VEHICLE HAVING A LIFT AXLE AND METHOD FOR OPERATING THE SAME

(71) Applicant: ZF CV Systems Global GmbH, Bern (CH)

(72) Inventor: Marco Seeger, Langenhagen (DE)

(73) Assignee: ZF CV Systems Global GmbH, Bern (CH)

( * ) Notice: Subject to any disclaimer, the term of this patent is extended or adjusted under 35 U.S.C. 154(b) by 2 days.

(21) Appl. No.: 17/679,991

(22) Filed: Feb. 24, 2022

(65) Prior Publication Data

US 2022/0388586 A1 Dec. 8, 2022

Related U.S. Application Data

(63) Continuation of application No. PCT/EP2020/074294, filed on Sep. 1, 2020.

(30) Foreign Application Priority Data

Sep. 13, 2019 (DE) ...................... 10 2019 124 649.0

(51) Int. Cl.
*B62D 61/12* (2006.01)
*B62D 59/04* (2006.01)

(52) U.S. Cl.
CPC .......... *B62D 61/125* (2013.01); *B62D 59/04* (2013.01)

(58) Field of Classification Search
CPC .. B62D 61/12; B62D 61/125; B60G 17/0155; B60G 2400/51222; B60G 17/0161;
(Continued)

(56) References Cited

U.S. PATENT DOCUMENTS

| 7,222,867 B2 * | 5/2007 | Rotz ...................... B62D 61/12 180/209 |
| 10,086,838 B2 * | 10/2018 | Flaum ................... B60W 10/22 |
| 2020/0369157 A1 | 11/2020 | Csontos et al. |

FOREIGN PATENT DOCUMENTS

| DE | 103 54 289 A1 | 6/2005 |
| DE | 603 14 533 T2 | 2/2008 |

(Continued)

OTHER PUBLICATIONS

International Search Report of the European Patent Office dated Dec. 17, 2020 for international application PCT/EP2020/074294 on which this application is based.

(Continued)

*Primary Examiner* — Paul N Dickson
*Assistant Examiner* — Caitlin Anne Miller
(74) *Attorney, Agent, or Firm* — Walter Ottesen, P.A.

(57) ABSTRACT

A motor vehicle has a steering axle, a drive axle and a lift axle having an actuator for lifting and lowering the same. The wheels of the drive axle can be electrically driven, at least in a supporting manner, via an electric machine operable as an electric motor and as a generator, and the wheels can be driven in a generating manner in a recuperation operation. The electric machine is connected to an accumulator and to a control and/or regulation device to control the operation of the lift axle. The device is connected to sensors for wheel slip detection at the drive axle. The device is configured such that, during a recuperation operation, it can send a command to the actuator to lift the lift axle and thereby unload the wheels thereof, if there is wheel slip at least at one wheel of the drive axle.

11 Claims, 2 Drawing Sheets

(58) Field of Classification Search
CPC .......... B60G 2300/026; B60G 2300/50; B60G 2400/60; B60G 2500/204; B60G 2500/20; B60G 2500/30; B60G 2800/02
USPC ...................................... 280/86.5, 10, 21, 23
See application file for complete search history.

(56) References Cited

FOREIGN PATENT DOCUMENTS

| | | | |
|---|---|---|---|
| DE | 10 2017 213 199 A1 | 1/2019 | |
| DE | 102017213199 A1 * | 1/2019 | ............... B60K 1/00 |
| EP | 1 674 306 A2 | 6/2006 | |
| EP | 1674306 A2 * | 6/2006 | ............. A01D 41/12 |
| EP | 2902224 A2 * | 8/2015 | ......... B60G 17/0161 |
| EP | 3 381 774 A1 | 10/2018 | |
| EP | 3381774 A1 * | 10/2018 | ......... B60G 17/0164 |
| GB | 2 518 053 A | 3/2015 | |
| JP | H02-262412 A | 10/1990 | |
| WO | WO-2022115566 A1 * | 6/2022 | |

OTHER PUBLICATIONS

Translation and Written Opinion of the International Searching Authority dated Dec. 17, 2020 for international application PCT/EP2020/074294 on which this application is based.

* cited by examiner

Fig.1

Fig.2

MOTOR VEHICLE HAVING A LIFT AXLE AND METHOD FOR OPERATING THE SAME

CROSS REFERENCE TO RELATED APPLICATIONS

This application is a continuation application of international patent application PCT/EP2020/074294, filed Sep. 1, 2020 designating the United States and claiming priority from German application 10 2019 124 649.0, filed Sep. 13, 2019, and the entire content of both applications is incorporated herein by reference.

TECHNICAL FIELD

The disclosure relates to a motor vehicle for transporting a load and/or persons on a road, which has at least one steering axle, at least one drive axle and at least one lift axle with at least one actuator for lifting and lowering the same, wherein the wheels of the at least one drive axle can be electrically driven at least supportively via at least one electric machine which can be operated as an electric motor and as a generator and in the case of a recuperation mode of the motor vehicle can be used for driving in a generator mode, and in which the at least one electric machine is connected to an electric accumulator and to a control and/or regulation device, which is configured for the control and/or regulation of the electromotive and generator mode of the at least one electric machine and for the control and/or regulation of the operation of the at least one lift axle. In addition, the disclosure relates to a method for operating such a motor vehicle and a control and/or regulation device for carrying out this method.

BACKGROUND

From the prior art, motor vehicles are known which can be driven at least partially supported via a motorized electric machine fed by an electric accumulator. During a recuperation mode, in which the motor vehicle is rolling without drive and the electric motor is driven by vehicle wheels as a generator, the vehicle is decelerated and the generated electrical energy is fed into the accumulator to extend the range of the motor vehicle. The use of a purely mechanical, friction-based braking system is therefore often not necessary in normal operation of the motor vehicle.

From US 2020/0369157 a setting device for an electrically operated commercial vehicle and a method for operating the same are known. This motor vehicle has a front axle and at least two rear axles and a pneumatic level adjustment device for at least one of the two rear axles. In addition, this motor vehicle has at least one electric motor for motorized driving of the wheels of the rear axles and a battery which supplies the electric motor with power during motorized operation. In a recuperation mode, in which the electric motor operates as a generator and is driven by the wheels of the rear axles to charge the battery, the level adjustment device adjusts the level of the vehicle relative to the road as well as the adjustable rear axle so that the load acts on both rear axles essentially equally. This is intended to improve the recuperation mode. Such an optimization of the recuperation mode is only envisaged during downhill travelling of the motor vehicle. For this purpose, an air suspension system is required on the vehicle for load distribution on the rear axles.

SUMMARY

It is an object of the disclosure to provide a motor vehicle with which a further improved recuperation mode is possible. In addition, a method for the operation of such a motor vehicle is to be described.

The solution of this object can, for example, be achieved by a motor vehicle for the transport on a road of at least one of a load and persons. The motor vehicle includes: at least one steering axle; at least one drive axle having a plurality of drive axle wheels; at least one lift axle having lift axle wheels and at least one actuator configured to lift and lower the at least one lift axle; at least one electric machine configured to be operated as an electric motor and as a generator; the electric machine being further configured, when the motor vehicle is in a recuperation mode, to drive as a generator; the electric machine being configured to, at least supportively, drive the drive axle wheels of the at least one drive axle; an electric accumulator; a control and/or regulation device; the at least one electric machine being connected to the electric accumulator and the control and/or regulation device; the control and/or regulation device being configured to control and/or regulate an electromotive and a generator mode of the at least one electric machine and further configured to control and/or regulate operation of the at least one lift axle; a plurality of sensors for wheel slip detection on the plurality of drive axle wheels; the control and/or regulation device being connected to the plurality of sensors; and, the control and/or regulation device being further configured such that during an active recuperation mode the control and/or regulation device can send a control command to the at least one actuator of the at least one lift axle for lifting the at least one lift axle and thereby relieving a load on the lift axle wheels if wheel slip is occurring on at least one of the plurality of drive axle wheels of the at least one drive axle.

The aforementioned object can, for example, also be achieved by a method for operating a motor vehicle on a road for the transport of at least one of a load and persons. The motor vehicle has at least one steering axle, at least one drive axle and at least one lift axle with at least one actuator for lifting and lowering the at least one lift axle, wherein the at least one drive axle has wheels configured to be electrically driven at least supportively via at least one electric machine which can be operated as an electric motor and as a generator and which can be used for driving in a recuperation mode of the motor vehicle, wherein the at least one electric machine is connected to an electric accumulator and to a control and/or regulation device for control and/or regulation of an electromotive and a generator mode of the at least one electric machine and for controlling and/or regulating operation of the at least one lift axle. The method includes: a) checking whether the motor vehicle is in the recuperation mode with the generation and transfer of electrical energy into the electric accumulator as a result of the generator mode of the electric machine; b) recognizing that wheel slip is occurring on at least one of the at least one drive axle; and, c) in the presence of the conditions specified in each of the process steps a) and b), lifting the lift axle, wherein the at least one lift axle is a non-driven lift axle.

Accordingly, the disclosure first relates to a motor vehicle for transporting on a road a load and/or persons, which has at least one steering axle, at least one drive axle and at least one lift axle with at least one actuator for lifting and lowering the same, wherein the wheels of the at least one drive axle can be electrically driven at least supportively via at least one electric machine which can be operated as an electric motor and as a generator and in the case of a recuperation mode of the motor vehicle can be used in the generator mode, and in which the at least one electric machine is connected to an electric accumulator and to a control and/or regulation device, which is configured for the control and/or regulation of the electromotive and generator mode of the at least one electric machine and for the control and/or regulation of the operation of the at least one lift axle.

To solve the product-related object, it is provided in this motor vehicle that the control and/or regulation device is connected to sensors for wheel slip detection on the wheels of the at least one drive axle, and that the control and/or regulation device is configured in such a way that during an active recuperation mode it can send a control command to the at least one actuator of the lift axle to lift the same and thereby to relieve the load on the wheels thereof if wheel slip is occurring on at least one wheel of the at least one drive axle.

It is known in principle that during non-driven forward travel of the motor vehicle no active drive of the wheels of the at least one drive axle takes place due to at least one electric motor or a combustion engine. By driver operation of a brake pedal or by activation of an automatic braking system, such as a distance assistant, emergency brake assistant, or a speed assistant, the recuperation mode and, if necessary, a purely mechanical, friction-based braking operation are initiated until a specified speed is reached or until the motor vehicle comes to a complete standstill. In the recuperation mode, the electric machine is operated in the generator mode. The electrical energy generated in this way is fed into the electric accumulator of the motor vehicle, while in purely mechanical braking mode the reduced kinetic energy of the motor vehicle is converted into heat energy which is no longer technically usable.

By the configuration of a motor vehicle according to the disclosure, it can be ensured there is good traction of the wheels of the at least one drive axle in the recuperation mode even with wheel slip occurring, since the wheels of the non-lifted at least one drive axle are loaded with a greater load force. In addition, the recuperation mode is further optimized with regard to the electrical energy which can be generated, because the mechanical load generated by the electric machine in the generator mode can be well supported on the road via the vehicle wheels.

The motor vehicle configured in this way may be fully electric or operated via a combination of at least one generic electric motor and one combustion engine, that is, by a hybrid drive. In addition, such a motor vehicle may optionally be equipped with an air suspension system for level control and for load-dependent adjustment of the suspension. In this case, each air spring can be equipped with a pressure sensor. By evaluating the pressure measurement values with the help of the control and/or regulation device, the vertical loads acting on the wheels of the axles can then be determined.

In the motor vehicle proposed here, it can preferably be provided that the control and/or regulation device is configured in such a way that it can at least partially lift the non-driven lift axle via control commands to the at least one assigned actuator and thereby at least partially relieve the load thereon, so that the additional load force acting on the at least one drive axle can be variably adjusted. By at least partially lifting the lift axle, the load force on the at least one drive axle can therefore be continuously varied, wherein the wheels of the lift axle can still have full, but load-relieved contact with the road.

The mentioned at least one actuator on the lift axle can preferably be pneumatically actuated in commercial vehicles, because such motor vehicles usually have a compressed air generation device for the mechanical braking system. Alternatively, electromotive or hydraulically operated actuators can also be used to lift and lower the lift axle.

In the case of a commercial vehicle in the form of an articulated truck with a towing vehicle and a three-axle articulated trailer, it may be provided by way of example that by a complete lifting of the lift axle or its wheels from the road, the load force then acting on the two drive axles is increased by 50% each. This avoids wheel slip and the associated loss of traction of the wheels on the two drive axles which can be driven by electric motors, thereby also improving the recuperation mode. If the described partial or complete lifting of the lift axle did not take place in the event of wheel slip, the braking effect of the electric machine working in the generator mode would not be able to be supported on the road due to the wheel slip. In addition, reliable lane-keeping driving behavior of the motor vehicle would no longer be ensured due to the wheel slip.

Furthermore, it can preferably be provided that for detecting the slip via the control and/or regulation device at least one revolution rate sensor is assigned to each wheel of the at least one drive axle, via which the control and/or regulation device is connected in terms of signaling technology or data technology. Through an analysis via the control and/or regulation device of the revolution rates of the wheels of the at least one drive axle determined by the revolution rate sensors, a reliable slip detection or the detection of any traction loss of the drive axle in the recuperation mode is possible.

In addition, at least one sensor implemented as a revolution rate sensor may be arranged on the wheels of the lift axle and/or the wheels of the steering axle and the drive axle of the towing vehicle for further completion of the wheel slip detection via the control and/or regulation device.

Furthermore, it may be provided that the control and/or regulation device is assigned at least one inclination sensor, via which the inclination of the road on which the motor vehicle is driving can be determined, and that the control and/or regulation device is connected to this at least one inclination sensor in terms of signaling technology or data technology. The inclination sensor can be used to detect whether the vehicle is moving on an essentially horizontal road. In such a configuration, the lifting of the lift axle is given priority in the event of any slip on the at least one drive axle in the recuperation mode.

The motor vehicle is in the form, for example, of a single-part truck or as an articulated truck with a towing vehicle and an articulated trailer, wherein the single-part truck or the articulated truck can be at least supportively driven via the at least one electric machine. This ensures particularly flexible applicability of the motor vehicle.

In addition, it can preferably be provided that the control and/or regulation device is in the form of a compact control unit, which has at least one digital computing unit. As a result, wheel slip detection can be carried out in real time via the revolution rate sensor assigned to one wheel of each axle. In addition, an inclination detection via the at least one inclination sensor and control and/or regulation of the at least two actuators for lifting the lift axle in the recuperation mode and for lowering the same can be achieved. In the case of a two-part motor vehicle, such as an articulated truck with a towing vehicle and an articulated trailer or a truck with a trailer, both the towing vehicle and the articulated trailer are preferably equipped with an inclination sensor.

In addition, the disclosure relates to a method for operating a motor vehicle for transporting a load and/or persons on a road, which has at least one steering axle, at least one drive axle and at least one lift axle with at least one actuator for lifting and lowering the same, wherein the wheels of the at least one drive axle can be electrically driven at least supportively via at least one electric machine which can be operated as an electric motor and as a generator, and which can be used for driving in a recuperation mode of the motor vehicle, and in which the at least one electric machine is connected to an electric accumulator and to a control and/or regulation device which is configured for controlling and/or regulating the electromotive and generator mode of the at least one electric machine and for controlling and/or regulating the operation of the at least one lift axle. The method has the following procedural steps for this:

a) checking whether the motor vehicle is in a recuperation mode with the generation and transfer of electrical energy into the electric accumulator due to a generator mode of the electric machine,
b) detecting that at least one drive axle has wheel slip, and
c) if the condition specified in the process steps a) and b) respectively is met, lifting the non-driven lift axle.

As a result, in the recuperation mode, the at least one drive axle and thus the wheels thereof are exposed to a significantly increased vertical load force. As a result, more electrical energy is generated and fed into the accumulator due to the resulting improved traction of the wheels driving the electric motor.

Furthermore, it may be provided according to the disclosure that the load force acting on the at least one drive axle is variably adjusted within limits by at least partial lifting or lowering of the at least one lift axle. It may make sense that the at least one lift axle is only lifted to such an extent that the wheels thereof are largely relieved of load, but still have contact with the road. In this way, on the one hand a desired load increase is generated for the wheels of the two driving drive axles, and on the other hand the lift axle can be restored very quickly to its fully lowered operating position.

It can preferably be provided that the wheel slip is measured with the help of the revolution rate sensors assigned to the control and/or regulation device, which are assigned to each wheel of the at least one drive axle. This enables reliable detection of wheel slip on the wheels of the at least one drive axle.

In addition, a revolution rate sensor may be arranged on each of the wheels of the lift axle and/or on each of the wheels of the steering axle and the drive axle of the towing vehicle to further complete the wheel slip detection via the control and/or regulation device. The revolution rate measurement values thereof are used according to the method. Particularly advantageously, data of an ABS braking system already present on the motor vehicle can be used by the control and/or regulation device to achieve the described purpose.

Finally, it may be provided that via at least one inclination sensor assigned to the control and/or regulation device, an inclination of the road is detected which may or may not be usable for a recuperation mode with the lift axle lifted. The disclosure provides that the lift axle is only lifted if the road inclination does not exceed a given value. This road inclination value which is not to be exceeded may be an 8% road inclination, for example. Especially during steep downhill travel, this ensures that the low traction available on the possibly slipping wheels of the lift axle can also be used to brake the motor vehicle as safely as possible.

The disclosure also relates to a control and/or regulation device which is arranged in a motor vehicle and configured in such a way that the method can be carried out via the control and/or regulation device.

BRIEF DESCRIPTION OF THE DRAWINGS

The invention will now be described with reference to the drawings wherein.

DESCRIPTION OF THE PREFERRED EMBODIMENTS

Figure 1:
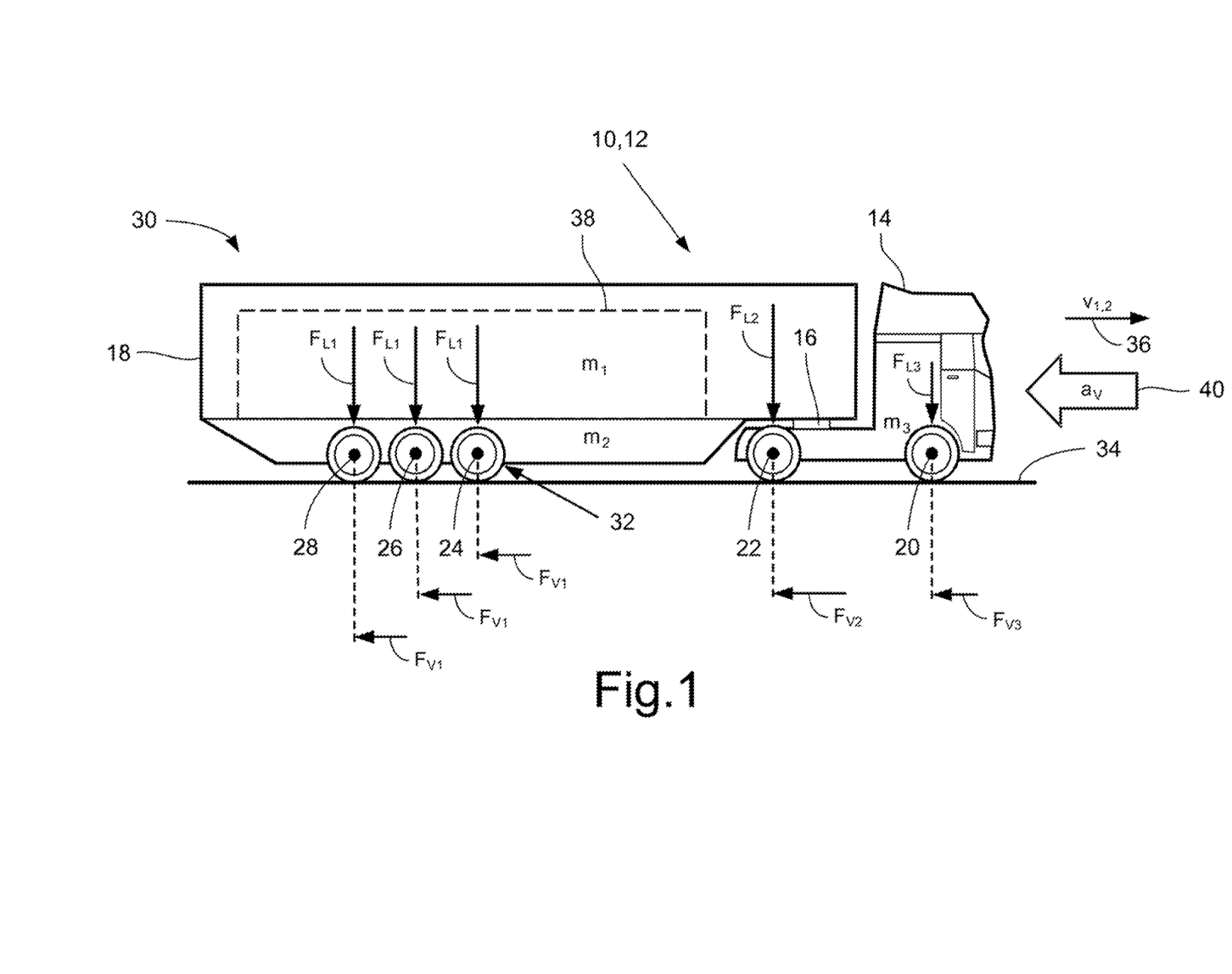
FIG. 1 shows a schematic representation of the forces acting on a known motor vehicle during a one-time deceleration process for speed adjustment from 85 km/h to 70 km/h with a constant negative acceleration of 1.0 m/s$^2$; and, FIG. 2 shows a schematic representation of the forces acting on a motor vehicle according to the disclosure with a lifted lift axle in the course of the same deceleration process in a recuperation mode.

FIG. 1 thus shows a schematic representation of the forces acting on a known motor vehicle during a one-time deceleration process for speed adjustment from 85 km/h to 70 km/h with a constant negative acceleration of 1.0 m/s$^2$.

The motor vehicle 10 is in the form here only by way of example of an articulated truck 12 with a towing vehicle 14 with a coupling point 16, to which an articulated trailer 18 is linked. The towing vehicle 14 has a steering axle 20 and a drive axle 22 arranged downstream thereof in relation to the forward direction of the articulated trailer 18, which may be driven, for example, by a combustion engine of the towing vehicle 14. The articulated trailer 18 has here, only by way of example, three rear axles 24, 26, 28, which are combined to a rear axle group 32 in a rear end area 30 of the articulated trailer 18 facing away from the towing vehicle 14. At least one of the three rear axles 24, 26, 28 can be driven with at least partial electromotive support.

The motor vehicle 10 or the two-part articulated truck 12 is moving on the here essentially horizontal road 34 with an initial speed $v_1$, as indicated by the direction arrow 36. At least one of the three rear axles 24, 26, 28 of the articulated trailer 18 may be in the form of a lift axle or a lifting axle for temporary and at least partial lifting from the road 34 to reduce the rolling resistance and tire wear of the articulated trailer 18.

The articulated trailer 18 is loaded with a load 38, which is only graphically indicated symbolically, which has a mass $m_1$. The articulated trailer 18 also has a net mass $m_2$, while the towing vehicle 14 has a net mass $m_3$. The mass $m_1$ of the load 38 in the embodiment shown here is 20,000 kg, the unladen mass $m_2$ of the articulated trailer 18 is 7,000 kg, and the mass $m_3$ of the towing vehicle 14 is 8,000 kg.

Due to the mass $m_1$ of the load 38 and the mass $m_2$ of the articulated trailer 18, a vertical load force $F_{L1}$ of about 70 kN acts on each one of the three rear axles 24, 26, 28 of the articulated trailer 18. Due to the masses $m_2$, $m_3$, a vertical load force $F_{L2}$ of about 80 kN acts on the drive axle 22 of the towing vehicle 14, and the steering axle 20 of the towing vehicle 14 must still support a remaining vertical load force $F_{L3}$ of about 60 kN.

In the case of a one-time deceleration process 40 (a so-called single adaptive braking event), a negative acceleration $a_v$ of approx. 1.0 m/s$^2$ acts on the motor vehicle 10, whereby an initial speed $v_1$ of the motor vehicle 10 of about 85 km/h is reduced to a final speed $v_2$ of about 70 km/h. In the course of the one-time deceleration process 40, each of the three rear axles 24, 26, 28 of the articulated trailer 18 is loaded with a deceleration force $F_{v1}$ of the order of 7 kN. The deceleration force $F_{v2}$ on the drive axle 22 of the towing vehicle 14 is about 8 kN in this one-time deceleration process 40 and the steering axle 20 must still apply a deceleration force $F_{V3}$ of 6 kN in this well-known motor vehicle 10.

Figure 2:
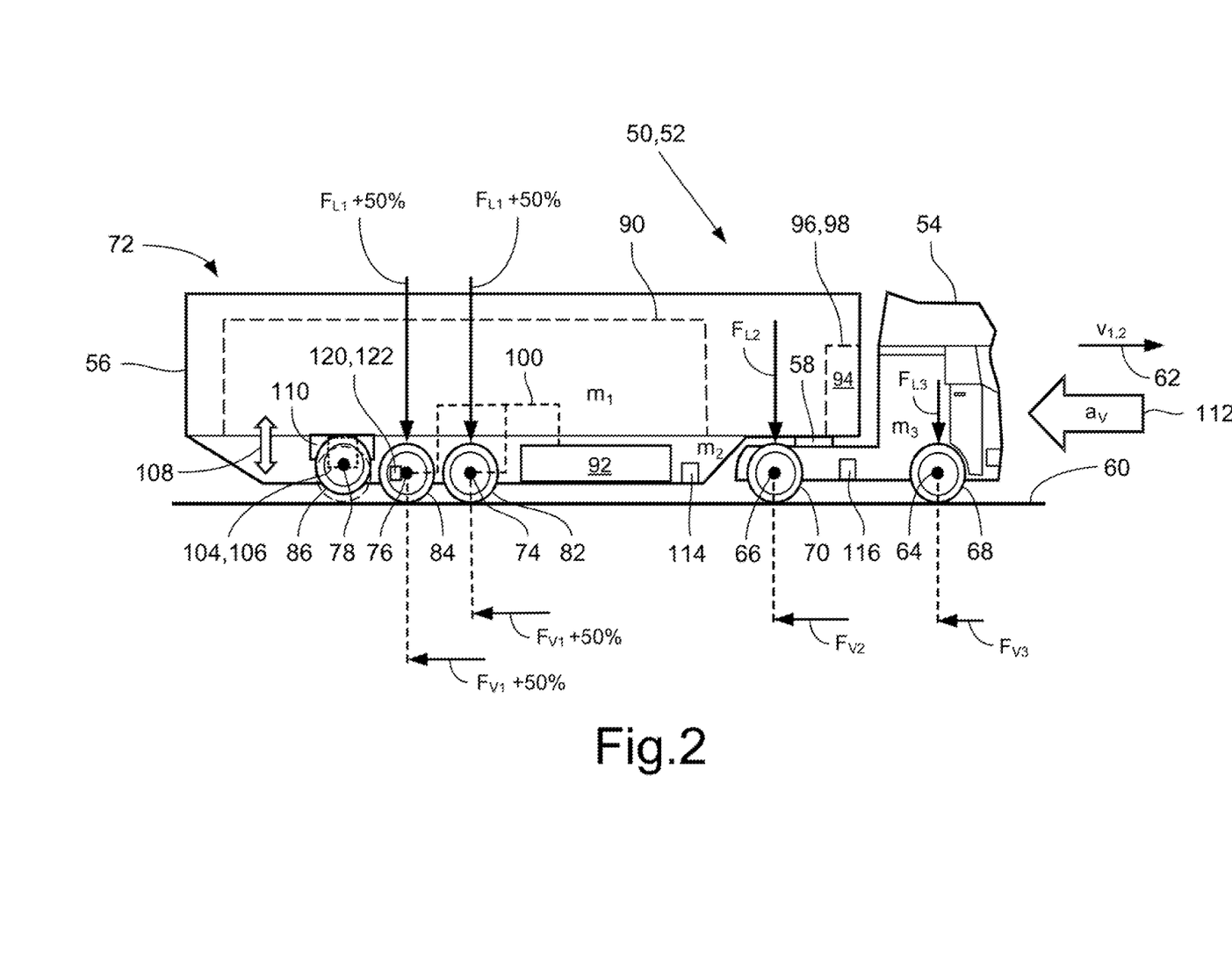

FIG. 2 shows in comparison a schematic representation of the forces acting on a motor vehicle according to the disclosure with a lifted lift axle in the course of a deceleration process during a recuperation mode.

The motor vehicle 50 shown there is also in the form of a two-part articulated truck 52 with a towing vehicle 54 and an articulated trailer 56. The towing vehicle 54 has a coupling point 58 for the articulated connection of the articulated trailer 56. Alternatively, the motor vehicle 50 may also be in the form of a single-unit truck (panel van) or as a two-part truck consisting of a truck with a trailer. The motor vehicle 50 is moving at the speed $v_1$ over the essentially horizontal road 60, as indicated by the arrow 62.

The towing vehicle 54 also has a steering axle 64 and a driven rear axle 66 or drive axle following this, which may be driven, for example, by a combustion engine, which is not shown, of the towing vehicle 54. Alternatively, the towing vehicle 54 may have a hybrid drive with a partially electromotively supported combustion engine or a fully electric drive. In addition, a fuel cell drive of the towing vehicle 54 is possible.

In the case of a single-part motor vehicle which is not shown, it has a chassis with a steering axle and at least one downstream drive axle or rear axle. The drive axle can be driven at least supportively via at least one electric machine which can be operated electromotively and as a generator. In addition, there is a lift axle downstream of this drive axle.

But now back to the motor vehicle 50 according to FIG. 2: the steering axle 64 of the towing vehicle 54 has two wheels here, of which only one wheel 68 is visible and marked. The same applies to the wheels of the rear axle 66 of the towing vehicle 54, of which only one wheel 70 is also visible and marked. The wheels of the steering axle 64 and the rear axle 66 of the towing vehicle 54 behind the plane of the drawing are not shown in FIG. 2. The wheels 70 of the rear axle 66 of the towing vehicle 54 may be fitted with twin tires in the case of higher loads due to the articulated trailer 56.

The articulated trailer 56 has two drive axles 74, 76 in the area of its rear 72, which can be driven at least supportively via at least one electric machine, which is not shown. In addition, the articulated trailer 56 has a non-driven lift axle 78 or lifting axle downstream of the two drive axles 74, 76. The articulated trailer 56 is therefore in the form of a so-called "e-trailer" here.

The two drive axles 74, 76 and the lift axle 78 are only combined here by way of example and are arranged in a triple axle group in the area of the rear 72 of the articulated trailer 56. The drive axles 74, 76 and the lift axle 78 each have two wheels, of which only the wheels 82, 84 of the two drive axles 74, 76 and the wheel 86 of the lift axle 78 in the plane of the drawing can be seen here. The wheels of the drive axles 74, 76 and the lift axle 78 located behind the plane of the drawing therefore cannot be seen. The wheels 82, 84 of the two drive axles 74, 76 and the wheels 86 of the lift axle 78 may, if necessary, be in single or twin tire or triple tire form. The trailing rear axle 66 or drive axle of the towing vehicle 54 may also be in the form of an at least partially electromotively supported drive axle analogous to the drive axles 74, 76 of the articulated trailer 56.

The articulated trailer 56 is provided with a load 90 with a mass $m_1$ which is loaded there. The articulated trailer 56 itself has a mass $m_2$ when not loaded, while the mass of the towing vehicle 54 is indicated with the reference character $m_3$. The magnitudes of the mentioned masses $m_1$, $m_2$, $m_3$ are the same as in the embodiment according to FIG. 1.

A powerful electric accumulator 92 is also arranged on the articulated trailer 56 close to the ground and is used to supply the at least one electric machine, which is used as an auxiliary drive, with electrical energy. In addition, the articulated trailer 56 has a complex control and/or regulation device 94, which is realized here as a compact electronic control unit 96 with at least one digital computing unit 98.

All axles of the motor vehicle 50 may be equipped with an air spring system which is not shown. For this purpose, the two drive axles 74, 76 and the one lift axle 78 of the articulated trailer 56 as well as the steering axle 64 and the rear axle 66 of the towing vehicle 54 are each assigned at least two air springs which are not shown.

In this embodiment, the lift axle 78 can be lifted at least partially or completely and lowered again completely or partially via two of these assigned actuators 104, 106, which can be operated by the control and/or regulation device 94 as part of a lifting device 110 of the lift axle 78 of the articulated trailer 56. The double arrow 108 illustrates such lifting movements. Of course, it is also possible in the context of the disclosure that for lifting and lowering the lift axle 78 only a single actuator is used, which can preferably be arranged in the middle of the lift axle 78 and acts on it with an actuating force if necessary.

In the context of the present description, the term the partial lifting of the lift axle 78 means that the lift axle 78 is only slightly lifted and therefore only partially relieved of load. As a result, the wheels 86 thereof remain in contact with the road 60, but a reduced vertical force acts on them. As a result of such an approach, the load on the wheels 82, 84 of the drive axles 74, 76 remaining in contact with the road 60 can be variably adjusted within wide limits via the control and/or regulation device 94.

In contrast to the sketch of FIG. 1, the position of the wheels 86 of the lift axle 78 which are fully in contact with the road 60 is drawn with a dashed outline representation in FIG. 2. In contrast, the wheels 86 of the lift axle 78 which are completely lifted off the road 60 are shown in FIG. 2 with a solid line.

In the case of the lift axle 78 lowered completely in relation to the road 60, in the illustration according to FIG. 2 essentially the same mechanical load forces $F_{L1}$ act on the two drive axles 74, 76, which are at least electromotively supportively driven, and on the lift axle 78 of the articulated trailer 56. The same applies to the load force $F_{L2}$ on the rear axle 66 and to the load force $F_{L3}$ on the steering axle 64 of the towing vehicle 54 of the articulated truck 52. The three essentially static load forces $F_{L1}$, $F_{L2}$, $F_{L3}$ are caused by the three mentioned masses $m_1$, $m_2$, $m_3$ under the influence of the gravity of the Earth. In the event that the motor vehicle 50 is equipped with an air suspension system, these load forces $F_{L1}$, $F_{L2}$, $F_{L3}$ can be measured, for example, with the help of pressure sensors integrated in the air springs of the air spring system and their values can be recorded and processed via the control and/or regulation device 94.

In a one-time deceleration process 112 with a negative deceleration $a_v$ of, for example, 1.0 m/s² here, the deceleration forces $F_{V1}$ essentially again act on the drive axles 74, 76 and the lift axle 78 of the articulated trailer 56 in the case of a lift axle 78 which is completely lowered onto the road 60, analogous to the representation of FIG. 1. In addition, the two deceleration forces $F_{V2}$, $F_{V3}$ act on the rear axle 66 and on the steering axle 64 of the towing vehicle 54. The deceleration force $F_{V1}$ also acting on the lowered lift axle 78, which is shown in FIG. 2 with a dashed line, is not shown for the sake of a better overview.

In the case in which the lift axle 78 of the articulated trailer 56 is completely lifted off from the road 60, a different situation results from the example of a known motor vehicle 10 shown in FIG. 1. Accordingly, a 50% greater load force $F_{L1}$+50% is acting on each of the wheels 82, 84 of the two drive axles 74, 76 remaining in contact with the road 60 because the two drive axles 74, 76 have each taken over half of the load force $F_{L1}$ no longer supported by the lift axle 78. This significantly increases the traction of the wheels 82, 84 of the two drive axles 74, 76 of the articulated trailer 56 remaining in contact with the road 60. In the described deceleration process 112 with the negative deceleration $a_v$, increased deceleration forces $F_{V1}$+50% likewise act on the two drive axles 74, 76.

Furthermore, in the embodiment shown in FIG. 2, it is provided that the towing vehicle 54 and the articulated trailer 56 each have at least one inclination sensor 114, 116, which are also connected to the control and/or regulation device 94. For this purpose, the inclination sensors 114, 116 may be connected to the control and/or regulation device 94 for data transmission via a suitable data bus system, or via another control unit which is not shown here.

Preferably, a sensor is also available on each wheel 68, 70, 82, 84, 86 of the motor vehicle 50 for wheel slip detection. The sensors, which can preferably be in the form of revolution rate sensors, are each connected to the control and/or regulation device 94 in a suitable manner by cables which are not shown or by the mentioned data bus system. For the sake of a better graphical overview, only a sensor 120 assigned to the second drive axle 76 of the articulated trailer 56, in particular a revolution rate sensor 122, is shown here as representative of all other sensors.

In a normal driving mode of the articulated truck 52, the two drive axles 74, 76 of the articulated trailer 56 are driven at least supportively by the at least one electric machine working electromotively, which in turn is fed by the accumulator 92 with the necessary electrical energy. The at least one electric machine is arranged here close to the wheel hub and connected to the accumulator 92 via electrical cables 100. The control and regulation of the at least one electric machine which is supportively electromotively driving the two drive axles 74, 76 of the articulated trailer 56 can also be carried out via the control and/or regulation device 94.

In a normal braking process of the articulated truck 52, the recuperation mode is active and the electrical energy released in the generator mode of the at least one electric machine can be fed into the accumulator 92 controlled by the control and/or regulation device 94, for example to extend the range of the motor vehicle 50. In the event that stronger braking or emergency braking of the motor vehicle 50 is required, a mechanical and friction-based braking system which is not shown can be used in the recuperation mode.

The control and/or regulation device 94 is configured according to the disclosure in such a way that in the active recuperation mode of the at least one electric machine and in the event of the occurrence of wheel slip or a loss of traction on the wheels 82, 84 of the at least one drive axle 74, 76 of the articulated trailer 56 and/or with the lift axle 78 lowered, this lift axle 78 is at least partially lifted via actuators 104, 106. As a result, the load force Fu acting on each of the wheels 82, 84 of the two drive axles 74, 76 remaining in contact with the road 60 increases by up to 50%. This prevents slip or spinning of the wheels 82, 84 of the two drive axles 74, 76 of the articulated trailer 56 in the regenerative recuperation mode of the electric machine, so that the braking effect of the recuperation mode increases and more electrical energy can be fed into the accumulator 92.

The detection of any slip on the wheels 82, 84 of the articulated truck 52 can preferably be carried out with the help of the respective revolution rate sensors 122 assigned to the wheels, the measured values or data of which can be fed to the control and/or regulation device 94 for evaluation. Alternatively, the control and/or regulation device 94 may optionally use digital data or analog measured values of an already existing anti-lock braking system of the motor vehicle 50.

With the help of the here two inclination sensors 114, 116 connected to the control and/or regulation device 94, it is also possible to determine whether the articulated truck 52, as shown here, is moving on an essentially horizontal or a strongly sloping road 60. This is because the lifting of the lift axle 78 can lead to an impairment of the effect of the use of the mechanical brake of the articulated truck 52, which may be necessary in the recuperation mode, if the downhill gradient of the road 60 is too steep. Here, the arrangement of the first inclination sensor 116 on the towing vehicle 54 and the second inclination sensor 114 on the articulated trailer 56 allows a predictive downhill gradient detection to the extent that the control command is delivered to the actuators 110 for the complete lowering of the lift axle 78 before the articulated trailer 56 with the heavy load 90 drives along a section of the road 60 with a predefined excessive downhill gradient.

When using the method according to the disclosure, in a first process step a) it is checked by the control and/or regulation device 94 whether the at least one electric machine which is at least supportively driving the drive axles 74, 76 in the recuperation mode is being operated as a generator, so that braking energy recovery on the articulated trailer 56 is active. In a second process step b) detection is carried out with the help of the control and/or regulation device 94 as to whether slip or loss of traction to the road 60 is occurring at least on the wheels 82, 84 of the at least one drive axle 74, 76 of the articulated trailer 56. In a final third process step c) if the conditions from the two preceding process steps a) and b) are met cumulatively, the lift axle 78 of the articulated trailer 56 is lifted so that the wheels 82, 84 of the at least one drive axle 74, 76 are loaded with an additional vertical load force.

As a result, the vertical load force Fu attributable to each of the two drive axles 74, 76 can be increased by up to 50% depending on how far the lift axle 78 is lifted off the road 60 ($F_{L1}$+50%). As a result, slip or loss of traction of the wheels 82, 84 on the two drive axles 74, 76 can be avoided and the braking effect and the generation of electrical energy in the recuperation mode of the at least one electric machine of the articulated trailer 56 can be increased. The detection of any slip on the wheels 82, 84 of the two drive axles 74, 76, the lift axle 78 as well as the steering axle 64 and the rear axle 66 of the towing vehicle 54 is carried out with the help of the revolution rate sensors 122 assigned to the wheels, which are connected to the control and/or regulation device 94. The digital data transmitted by the revolution rate sensors 122 or analog measured values are numerically evaluated in real time via the control and/or regulation device 94 and as a result at least one actuator 104, 106 of the lifting device 110 of the lift axle 78 is controlled accordingly.

Via the two inclination sensors 114, 116 in this case, downhill travelling of the articulated truck 52 can also be detected via the control and/or regulation device 94. As a result, the lifting of the lift axle 78 can be avoided in the event of an excessive downhill gradient of the road 60, or the already lifted lift axle 78 can then be at least partially lowered back to the road 60 via the at least one actuator 104, 106 of the lifting device 110 controlled by the control and/or regulation device 94.

It is understood that the foregoing description is that of the preferred embodiments of the invention and that various changes and modifications may be made thereto without departing from the spirit and scope of the invention as defined in the appended claims.

REFERENCE CHARACTER LIST (PART OF THE DESCRIPTION)

10 Motor vehicle (prior art)
12 Articulated truck
14 Towing vehicle
16 Coupling point of the towing vehicle 14
18 Articulated trailer of the motor vehicle 10
20 Steering axle of the towing vehicle 14
22 Drive axle of the towing vehicle 14
24 First rear axle of the articulated trailer 18
26 Second rear axle of the articulated trailer 18
28 Third rear axle of the articulated trailer 18
30 End area of the articulated trailer 18
32 Rear axle group of the articulated trailer 18
34 Road for the motor vehicle 10
36 Speed in forward direction, arrow
38 Load on the articulated trailer 18
40 Deceleration process of the motor vehicle 10
50 Motor vehicle (according to the disclosure)
52 Articulated truck
54 Towing vehicle
56 Articulated trailer
58 Coupling point on the towing vehicle 54
60 Road for the motor vehicle 50
62 Speed in forward direction, arrow
64 Steering axle of the towing vehicle 54
66 Rear axle of the towing vehicle 54
68 Wheel of the steering axle of the towing vehicle 54
70 Wheel of the rear axle of the towing vehicle 54
72 Rear of the articulated trailer 56
74 First drive axle of the articulated trailer 56
76 Second drive axle of the articulated trailer 56
78 Lift axle of the articulated trailer 56
82 Wheel of the drive axle 74 on the articulated trailer 56
84 Wheel of the drive axle 76 on the articulated trailer 56
86 Wheel of the lift axle 78 on the articulated trailer 56
90 Load on the articulated trailer 56
92 Electrical accumulator
94 Control and/or regulation device
96 Compact control unit
98 Digital computing unit
100 Electrical cables
104 First actuator on the lift axle 78
106 Second actuator on the lift axle 78
108 Vertical movement of the lift axle 78, double arrow
110 Lifting device
112 Deceleration process of the motor vehicle 50
114 Inclination sensor on the articulated trailer 56
116 Inclination sensor on the towing vehicle 54
120 Sensor
122 Revolution rate sensor $a_v$ Negative acceleration, deceleration
$m_1$ Mass of the load 38, 90
$m_2$ Net mass of the articulated trailer 18, 56
$m_3$ Net mass of the towing vehicle 14, 54
$F_{L1}$ Vertical load force on axle 24, 26, 28
$F_{L2}$ Vertical load force on axle 22
$F_{L3}$ Vertical load force on axle 20
$F_{L1}$+50% Vertical load force on axle 74, 76
$F_{V1}$ Deceleration force on axle 24, 26, 28; 74, 76, 78
$F_{V2}$ Deceleration force on axle 22; 66
$F_{V3}$ Deceleration force on axle 20; 64
$v_1$ Initial speed of the motor vehicle 10; 50
$v_2$ Final speed of the motor vehicle 10; 50

What is claimed is:

1. A motor vehicle for the transport on a road of at least one of a load and persons, the motor vehicle comprising:
   at least one steering axle;
   at least one drive axle having a plurality of drive axle wheels;
   at least one lift axle having lift axle wheels and at least one actuator configured to lift and lower said at least one lift axle;
   at least one electric machine configured to be operated as an electric motor and as a generator;
   said at least one electric machine being further configured, when the motor vehicle is in a recuperation mode, to drive as a generator;
   said electric machine being configured to, at least supportively, drive said drive axle wheels of said at least one drive axle;
   an electric accumulator;
   a control and/or regulation device;
   said at least one electric machine being connected to said electric accumulator and said control and/or regulation device;
   said control and/or regulation device being configured to control and/or regulate an electromotive and a generator mode of said at least one electric machine and further configured to control and/or regulate operation of said at least one lift axle;
   a plurality of sensors for wheel slip detection on said plurality of drive axle wheels;
   said control and/or regulation device being connected to said plurality of sensors; and,
   said control and/or regulation device being further configured such that during an active recuperation mode said control and/or regulation device can send a control command to said at least one actuator of said at least one lift axle for lifting said at least one lift axle and thereby relieving a load on said lift axle wheels if wheel slip is occurring on at least one of said plurality of drive axle wheels of said at least one drive axle.

2. The motor vehicle of claim 1, wherein said at least one lift axle is a non-driven lift axle; and, said control and/or regulation device is configured such that said control and/or regulation device can at least partially lift said at least one non-driven lift axle via control commands to said at least one actuator and thereby at least partially relieve said load so that an additional load force ($F_{L1}$) acting on said at least one drive axle can be variably adjusted.

3. The motor vehicle of claim 1, wherein said plurality of sensors are configured as revolution rate sensors, wherein at least one of said revolution rate sensors is assigned to each of said plurality of drive axle wheels; and, said control and/or regulation device is connected via said revolution rate sensors in terms of at least one of signaling technology and data technology.

4. The motor vehicle of claim 3 further comprising:
at least one inclination sensor; and,
wherein said control and/or regulation device is connected in terms of the signaling technology or data technology to said at least one inclination sensor and is configured to determine an inclination of a road on which the motor vehicle is driving via said at least one inclination sensor.

5. The motor vehicle of claim 3, wherein the motor vehicle is a single-part truck or an articulated truck with a towing vehicle and with an articulated trailer, wherein said single-part truck or said articulated trailer can be at least supportively driven via at least one electric machine.

6. A method for operating a motor vehicle on a road for the transport of at least one of a load and persons, the motor vehicle having at least one steering axle, at least one drive axle and at least one lift axle with at least one actuator for lifting and lowering the at least one lift axle, wherein the at least one drive axle has wheels configured to be electrically driven at least supportively via at least one electric machine which can be operated as an electric motor and as a generator and which can be used for driving in a recuperation mode of the motor vehicle, wherein the at least one electric machine is connected to an electric accumulator and to a control and/or regulation device for control and/or regulation of an electromotive and a generator mode of the at least one electric machine and for controlling and/or regulating operation of the at least one lift axle, the method comprising:
a) checking whether the motor vehicle is in the recuperation mode with the generation and transfer of electrical energy into the electric accumulator as a result of the generator mode of the at least one electric machine;
b) recognizing that wheel slip is occurring on at least one of the at least one drive axle; and,
c) in the presence of the conditions specified in each of the process steps a) and b), lifting the lift axle, wherein the at least one lift axle is a non-driven lift axle.

7. The method of claim 6, wherein a load force ($F_{L1}$) acting on the at least one drive axle is variably adjusted within limits by at least partial lifting or lowering of the at least one non-driven lift axle.

8. The method of claim 7, wherein the at least one non-driven lift axle has lift axle wheels; and, the at least one non-driven lift axle is lifted only to the extent that the lift axle wheels are largely relieved of load, but still have contact with the road.

9. The method of claim 7, wherein the motor vehicle includes a plurality of revolution rate sensors assigned to the control and/or regulation device; at least one of the plurality of revolution rate sensors is assigned to each wheel of the at least one drive axle; and, the wheel slip is measured with help of the revolution rate sensors.

10. The method of claim 6, wherein the motor vehicle includes at least one inclination sensor assigned to the control and/or regulation device, the method further comprising:
detecting a road inclination which is usable or unusable for recuperation mode with the non-driven lift axle lifted via the at least one inclination sensor.

11. A control and/or regulation device, which is arranged in a motor vehicle for the transport on a road of at least one of a load and persons, the motor vehicle having at least one steering axle, at least one drive axle and at least one lift axle with at least one actuator for lifting and lowering the at least one lift axle, wherein the at least one drive axle has wheels configured to be electrically driven at least supportively via at least one electric machine which can be operated as an electric motor and as a generator and which can be used for driving in a recuperation mode of the motor vehicle, wherein the at least one electric machine is connected to an electric accumulator, the control and/or regulation device comprising:
a processor;
a non-transitory computer readable storage medium having program code stored thereon;
the control and/or regulation device being configured to control and regulate an electromotive mode and a generator mode of the at least one electric machine and for at least one of controlling and regulating the at least one lift axle; and,
said program code being configured, when executed by said processor, to:
a) check whether the motor vehicle is in the recuperation mode with the generation and transfer of electrical energy into the electric accumulator as a result of the generator mode of the electric machine,
b) recognize that wheel slip is occurring on at least one of the at least one drive axle; and,
c) in the presence of the conditions specified in each of the process steps a) and b), lift said at least one lift axle, wherein said at least one lift axle is a non-driven lift axle.

* * * * *

UNITED STATES PATENT AND TRADEMARK OFFICE
CERTIFICATE OF CORRECTION

PATENT NO. : 11,845,503 B2
APPLICATION NO. : 17/679991
DATED : December 19, 2023
INVENTOR(S) : Marco Seeger It is certified that error appears in the above-identified patent and that said Letters Patent is hereby corrected as shown below:

In the Specification

<u>In Column 9</u>:
Line 65: delete "Fu" and insert -- $F_{L1}$ -- therefor.

<u>In Column 10</u>:
Line 50: delete "Fu" and insert -- $F_{L1}$ -- therefor.

Signed and Sealed this
Twenty-seventh Day of February, 2024

*Katherine Kelly Vidal*
Katherine Kelly Vidal
*Director of the United States Patent and Trademark Office*